US005155649A

United States Patent [19]

Hung et al.

[11] Patent Number: 5,155,649

[45] Date of Patent: Oct. 13, 1992

[54] SURGE PROTECTOR FOR TELECOMMUNICATIONS EQUIPMENT

[75] Inventors: Francis Y. T. Hung; James E. Anderson; Paul A. Taylor; William P. Trumble, all of Ontario, Canada

[73] Assignee: Northern Telecom Limited, Montreal, Canada

[21] Appl. No.: 592,451

[22] Filed: Oct. 2, 1990

Related U.S. Application Data

[63] Continuation-in-part of Ser. No. 415,780, Oct. 2, 1989, abandoned.

[51] Int. Cl.[5] .................... H02H 9/04

[52] U.S. Cl. .................... 361/119; 361/124; 361/126

[58] Field of Search .................... 361/58, 111, 117, 120, 361/124, 126, 125, 127, 119; 337/31

[56] References Cited

U.S. PATENT DOCUMENTS

| | | | |
|---|---|---|---|
| 4,056,840 | 11/1977 | Lundsgaard et al. | 361/124 |
| 4,212,047 | 7/1980 | Napiorkowski | 361/124 |
| 4,729,055 | 3/1988 | Dorival et al. | 361/119 |
| 4,796,150 | 1/1989 | Dickey et al. | 361/119 |
| 4,851,957 | 7/1989 | Chung | 361/124 |
| 4,856,060 | 8/1989 | Meyerhoefer et al. | 379/412 |

FOREIGN PATENT DOCUMENTS 0018067 10/1980 European Pat. Off. .

*Primary Examiner*—Todd E. DeBoer

*Attorney, Agent, or Firm*—Foley & Lardner

[57] ABSTRACT

An overvoltage protector for protecting equipment, especially telephone equipment, against high voltage surges such as are caused by lightning in the vicinity of the equipment or the cables to which it is connected, comprises one or more overvoltage protectors (42,58) mounted upon one face of an insulating support (18). A generally planar contact member (62) mounted upon the support member has a ground contact member (90) to make contact with a ground electrode (114) in the equipment to be protected and with each overvoltage protector. A spacer (60) of fusible plastics material extending between the contact member (62) and an interconnection (26) to one terminal (42A) of the protector melts when a sustained fault occurs. As the spacer melts, it permits an electrical connection between the contact member and the line to which the overvoltage protector is connected, effectively short-circuiting the line to ground. Overcurrent protection may be provided by means of a resistor (116) disposed in series with the line and located close to the plastics spacer so as to heat the spacer when an overcurrent occurs. In one case, the spacer comprises a film interposed directly between a pair of contacts which serve to short-circuit the protector. In another case, the spacer comprises a limb with relatively thin lateral projections which melt and shear. In both cases, the spacer preferably comprises high density, high molecular weight polyethylene.

45 Claims, 6 Drawing Sheets

SURGE PROTECTOR FOR TELECOMMUNICATIONS EQUIPMENT

This application is a continuation-in-part of U.S. patent application Ser. No. 07/415,780, filed Oct. 2, 1981 now abandoned.

FIELD OF THE INVENTION

This invention relates to protectors for protecting equipment against high voltage and/or currents such as are caused by lightning in the vincinity of the equipment or the cables to which it is connected. Embodiment of the invention are especially, but not exclusively, applicable to overvoltage protectors used for protecting telephone equipment.

BACKGROUND

Conventional such overvoltage protectors usually comprise a pair of gas tubes mounted coaxially within a housing. Fusible elements, typically discs of solder, are associated one with each of the gas tubes. The arrangement is such that, when an overload condition persists, for example when a power line contacts the telephone line, the heat generated in the gas tube will cause the fusible element to melt and short-circuit the gas tube, either directly or by releasing a spring-loaded plunger.

In U.S. Pat. No. 4,056,840, issued November 1977, P. S. Lundsgaard et al disclose such a protector having coaxial gas tubes with a fusible dielectric pellet mounted directly upon each gas tube. Melting of the dielectric pellet allows a resilient conductive member to short-circuit the gas tube.

In U.S. Pat. No. 4,851,957, issued July 1989, K. H. Chung discloses a lead or plastics pellet mounted directly upon a gas tube. The pellet maintains a contact member away from the electrodes of the gas tube. When the pellet melts, the contact member short-circuits the gas tube.

An alternative overvoltage protector is disclosed in U.S. Pat. No. 4,212,047 by Napiorkowski, issued Jul. 8, 1980, to which the reader is directed for reference. Napiorkowski discloses a protector having a sleeve of fluoroplastics material around the gas tube and a clip of spring metal surrounding the sleeve. When a sustained fault occurs, the heat generated causes the fluoroplastics material to melt, allowing the metal clip to contact the gas tube and effect the desired short circuit.

In practice, these known devices are susceptible to problems concerning the suitability of plastics material for use in overvoltage protectors of the kind used in telecommunications, especially in central offices and at subscriber's premises. As dicussed in U.S. Pat. No. 4,056,840, such protectors are designed to be "self-restoring" i. e. return to its open-circuit condition once the fault has been cleared. Typically, such a protector can be expected to operate many times during a useful life of as long as forty years without being subjected to a fault severe enough and sustained long enough, to fuse the plastics material and short-circuit the gas tube. Although such repeated operations do not generate enough heat to melt heat the plastics material, the plastics material nevertheless is subjected repeatedly to relatively high temperatures because it is in direct contact with the gas tube. This can lead to creepage of the plastics material and to premature failure.

The plastics material should also preferably exhibit a clearly defined and abrupt transition between its solid and molten states. The range of plastics materials which exhibit these characteristics and are capable of withstanding the relatively high temperatures associated with direct contact with the gas tube or other protection device is limited.

SUMMARY OF THE INVENTION

According to one aspect of the present invention, a protector for protecting telephone equipment against excessive voltages comprises:

a support member;

a protection device supported by said support member;

electrode means for coupling said protection device to the equipment to be protected;

mutually proximal first and second contacts spaced from said protection device, the first and third contacts being biased one towards the other;

interconnecting means connecting one terminal of said protection device to the electrode means and to the first contact;

a contact member connecting the second contact to a second terminal of the protection device and comprising a ground contact for connecting to a ground electrode extending adjacent the protector when the protector is installed in the equipment;

a spacer of the thermoplastics materials preventing electrical connection between the first contact and the second contact, there being a heat transfer path between the spacer and the protection device;

the arrangement being such that excessive heating of the protection device causes the spacer to melt and permit electrical connection between the first contact and the second contact.

Preferably the spacer comprises a high density, high molecular weight polyolefin, for example polyethylene. The spacer may comprise a film.

The support member, with the contact member assembled to it, may be housed in a housing having at least one aperture in a side juxtaposed to the support member. The ground contact portion may then be resiliently-biased to project through the aperture.

The support member may comprise a block of insulating material having a deflection temperature greater then the melting point of the spacer. The protection device may be disposed in a recess in the block.

In preferred embodiments of the invention, the support member has a pair of mutally-spaced protection devices, third and fourth mutually proximal contacts and a thermoplastics spacer maintaining electrical separation between the third and fourth contacts.

Second interconnecting means may then connect the third contact to a terminal of the second protection device and to a second electrode means for connection to the equipment. A heat transfer path between the second protection device and the second spacer provides for melting of the second spacer by heat generated by excessive current in the second protection device.

The contact member may have a second ground contact portion and the housing a corresponding second aperture.

The or each interconnecting means, conveniently a flat metal strip, may extend along one side of the member to the corresponding electrode means. Where two protection devices are provided, their respective interconnecting means may extend along opposite sides of the support member.

Preferably the or each protection device is a solid-state device.

Aspects of the invention also concern protection against excessive or so-called sneak current. In telecommunications equipment there is a need for protection against relatively low level current surges which are not accompanied by a voltage surge sufficient to operate the usual overvoltage protector but nevertheless can still damage the telecommunications equipment. To satisfy this need, sneak current protectors are used which incorporate a current sensitive element.

Known sneak current protectors employ a heat coil which fits into a three dimensional space frame. The heat coil comprises a resistive wire, in series with a telephone line or the like, and wrapped around a spool. A spring loaded plunger is soldered into the spool. When excessive current causes the heat coil to heat up, heat is transferred to the solder causing it to melt and the plunger to short the telephone line to ground, thereby shunting the excessive current away from the equipment. Usually, in an overvoltage protector of the gas tube kind described above, the heat coils are wound around the plunger and melt the same solder dics as the gas tubes.

Such known sneak current protectors are not entirely satisfactory because they involve a relatively complex set of thermal masses and condition paths. Their current protection levels are not easy to change and the protectors usually have to be custom made for each application which increases production costs.

Accordingly, protectors embodying the first aspect of the invention may further comprise a substantially planar resistance element, for example a ceramic chip resistor, connected to the electrodes so as to be in series with a line to be protected. The resistance element may be disposed in thermal proximity to the spacer of thermoplastics material.

According to a second aspect of the invention, a protector for protecting equipment against excessive overvoltages and excessive current comprises:

an overvoltage protection device;

a pair of electrodes for connecting the protector to equipment to be protected;

interconnecting means connecting respective ones of said pair of eletrodes to one terminal of said protection device;

a contact member for connecting a second terminal of said overvoltage protection device to a ground electrode of the equipment; first and second contacts connected to respective terminals of said protection device and biased one towards the other;

a thermoplastics spacer maintaining separation of said first and second contacts;

a substantially planar resistance element connected in series between one of said electrodes and said one terminal of said overvoltage protection device;

the interconnecting means serving to conduct heat from both said resistance element and said protection device to said thermoplastics spacer; and the arrangement being such that excessive heating of either one of the resistance element and the protection device causes the spacer to melt and permit contact between said first and second contacts.

In preferred embodiments of the second and third aspects of the invention, the resistance element is mounted upon a substrate, for example a printed circuit board, and the interconnection means comprises printed circuit elements connecting the resistance element in series with the equipment to be protected. The plastics spacer is also mounted upon the printed circuit board or substrate.

The length and cross-sectioned area of the printed circuit elements may be controlled to compensate for different amounts of heat generated in the protection device and the resistance element respectively.

According to another aspect of the invention, a protector for protecting against excessive currents in telecommunications equipment comprises a resistance element and electrodes for connecting the resistance element in series with a line to the equipment which is to be protected, such pair of contacts being mutually proximal and biased one towards the other but maintained apart by an insulating spacer. The spacer comprises a central limb and at least one lateral projection or arm, and comprises a fusible material. The projection abuts a heat-conductive element connected to the resistance element. One of the pair of contacts acts against the central limb to urge it towards the heat-conductive element. When an excessive current in the resistance element heats the spacer sufficiently, the plastics material at the junction between the lateral projection and the central limb melts and the central limb is displaced until the contacts meet.

BRIEF DESCRIPTION OF DRAWINGS

An embodiment of the invention will now be described by way of example only and with reference to the accompanying drawings in which.

Figure 1:
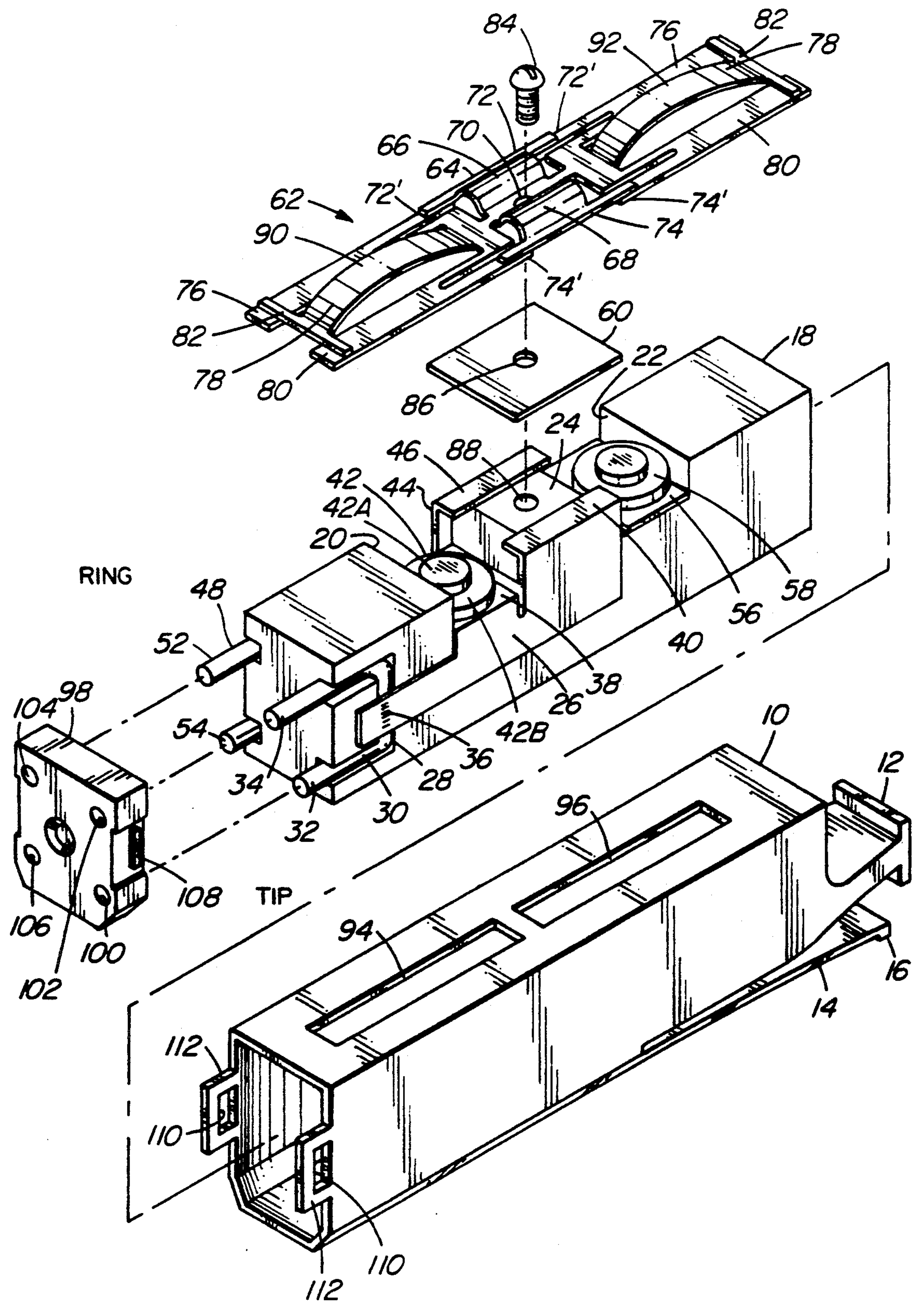
FIG. 1 is an exploded isometric view of a protector for use in equipment in a telephone central office and having a thermal shunt.
Figure 3:
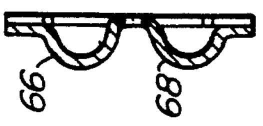
FIG. 3 is a cross-sectional view on the line 3—3 of FIG. 2.

BEST MODE(S) FOR CARRYING OUT THE INVENTION:

Referring to FIG. 1, an overvoltage protector for use in protecting equipment in a telephone central office comprises a housing 10 in the form of an elongate box, of square cross-section, closed at one end and open at the other. A handle 12 projects from the closed end. Adjacent the same end, a lever 14 extends generally parallel to the housing 10 and terminates in a lip 16. The lever 14 has a depending detent (not shown) which serves to limit withdrawal of the protector from the equipment at a predetermined position until the lever 14 is flexed to disengage the detent.

In its surface shown uppermost in FIG. 1, a support member 18 of generally parallelepiped shape has two recesses 20 and 22, respectively, spaced apart along its length, with a shoulder or land 24 between them. The housing 10 and support member 18 are made of insulating material, for example a synthetic plastics material such as Valox 420SEO (Trade Mark), a polyester by General Electric Corporation. An interconnecting member, in the form of a flat copper strip 26, extends along one side of the support member 18 between the shoulder or land 24 and a U-shaped groove 28 in the side of the support member 18. The groove 28 houses a U-shaped electrode 30 such that its limbs 32 and 34 protrude from the end of the support member 18 that will be adjacent the open end of housing 10 when installed. The limbs 32 and 34 serve as electrodes or contact pins to mate with complementary contacts in the equipment cabinet when the protector is installed.

The interconnecting strip 26 overlaps the U-shaped electrode 30 and is connected to it by crimping or soldering as at 36. The interconnecting strip 26 has two tabs 38 and 40, respectively, formed by bending the edge portions of the interconnecting strip 26 at right angles. Tab 38 extends along the bottom of recess 20 and tab 40 projects inwardly a short distance across the upper surface of shoulder or land 24. Tab 40 serves as a contact, as will become apparent in the ensuing description. A solid state overvoltage protection device 42 is accommodated in recess 20 and rests upon contact tab 38. The solid state overvoltage protection device 42 comprises two metal discs 42A and 42B, the latter larger than the former, which serve as terminals. The actual solid state device, typically a voltage-triggered semiconductor device providing bi-directional overvoltage protection, is sandwiched between the metal discs 42A and 42B.

A second interconnecting strip 44 extends along the opposite side of the support member 18 and is similar to interconnecting strip 26 in that it has a contact tab 46 projecting inwardly a short distance across shoulder or land 24 and is connected to a U-shaped electrode 48 housed in a groove 50. The limbs 52 and 54 of the U-shaped electrode 48 project from the end of the support member 18 in a similar manner to limbs 32 and 34.

The second interconnecting strip 44 differs from the first interconnecting strip 26 in that its second contact tab 56 extends across the bottom of the second recess 22. A second solid state overvoltage protection device 58, similar to device 42, rests upon tab 56 in recess 22. The dimensioning of the recesses 20 and 22 and the solid state overvoltage protection devices 42 and 58 is such that the upper faces of the devices 42 and 58 are flush with the uppermost surface of the support member 18.

Figure 2:
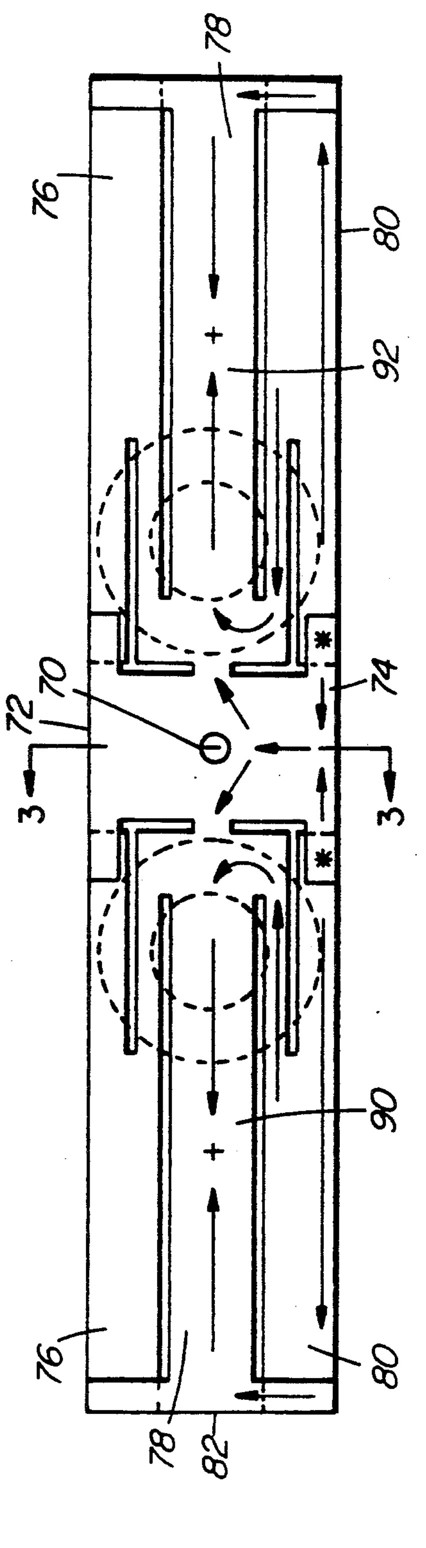
FIG. 2 is a plan view of a planar spring metal contact member of the protector showing current flow in the contact member after operation of the thermal shunt.

A film 60 of synthetic plastics insulating material, specifically high density, high molecular weight polyethylene, for example SCLAIR WCI 46C (Trade Mark) resin by Du Pont Inc., which has low creepage, extends across the upper surface of shoulder or land 24 of support member 18 and is clamped between it and the underside of a spring contact member in the form of a plate 62. This spring contact plate 62 is formed, conveniently by stamping and/or chemical milling, from a piece of flat stock beryllium-copper, or other suitable resilient contact material, as illustrated in FIG. 2. The contact plate 62 comprises a medial portion 64 deformed out-of-plane to form two semi-cylindrical thermal shunt springs 66 and 68, respectively, one each side of a central hole 70. The side margins 72 and 74 of medial portion 64 of the plate 62 serve as load distributors, extending longitudinally to overlap, and bear against, the underlying portions 72′ and 74′, respectively, of the plate 62.

Each distal portion of the contact plate 62 comprises three limbs 76, 78 and 80, respectively. Each middle limb 78 is generally T-shaped and arched, a lateral piece 82 at its extremity forming the cross bar of the "T" bearing against the adjacent end portions of limbs 76 and 78. The spring contact plate 62 and plastics film 60 are clamped to the support member 18 by a fastener in the form of a screw 84 which extends through the hole 70 in the spring contact plate 62 and a corresponding hole 86 in the plastics film 60 and into a screwthreaded hole 88 in the middle of shoulder or land 24 of support member 18.

Figure 4:
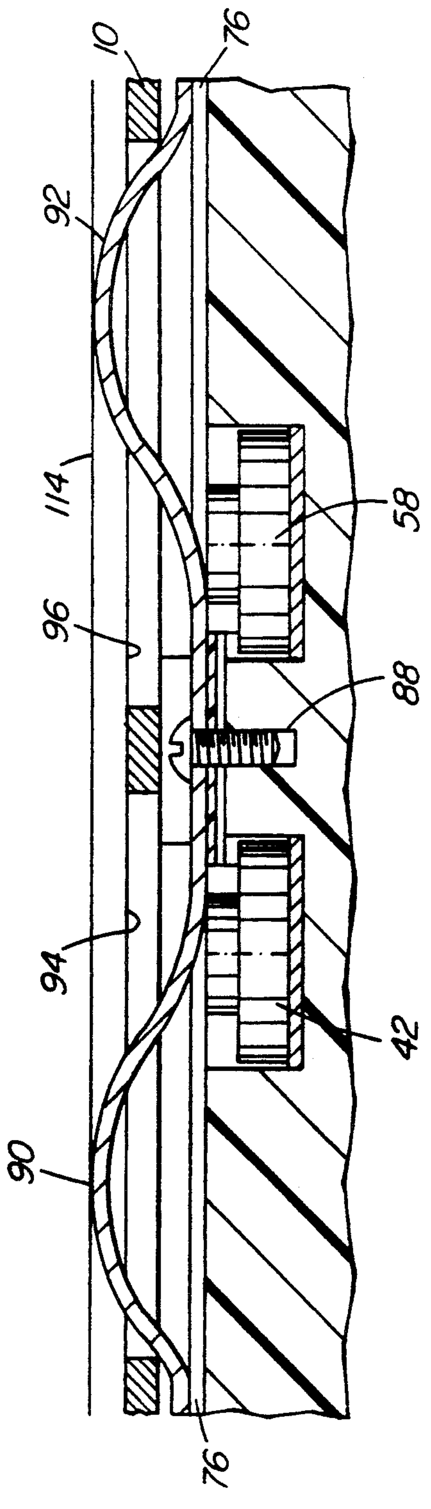
FIG. 4 is a fragmentary cross-sectional view on the longitudinal centre line of the protector.

The edge portions 72′ and 74′ beneath the load distributors, marginal portions 72′ and 74′, respectively, overlie contact tabs 46 and 40 and serve as contacts also. Contact tab 40 forms with contact portions 74′ a first pair of contacts. Contact tab 46 forms with contact portions 72′ a second pair of contacts. The edge portions 72′ and 74′ are biased towards the support member (downwards in the drawing) by the associated thermal shunt springs 66 and 68, respectively. Thus, when screw 84 is tightened, the thermal shunt springs 66 and 68 are deformed both elastically and plastically into their final position to obtain maximum and consistent spring travel and force. The plastics film 60 is clamped resiliently between contact plate 62, specifically the marginal contact portions 72′ and 74′, and contact tabs 40 and 46, and the solid state overvoltage protection devices 42 and 58 make good electrical contact with the underside of the contact plate 62 as shown in FIG. 4.

With the spring contact plate 62 and plastics film 60 assembled onto the support member 18, the assembly can be slid into housing 10. The arched portions 90 and 92 of middle limbs 78 of spring contact plate 62 will protrude through elongate longitudinal slots 94 and 96, respectively, in the juxtaposed wall of housing 10, as illustrated in FIG. 4.

An end cap 98 has four holes 100, 102, 104 and 106 to receive the contact pins 32, 34, 52 and 54, respectively, when the end cap 98 is fitted onto the end of support member 18 in housing 10. Lugs 108 (only one is shown) protrude laterally from the edges of end cap 98 to engage in holes 110 in extensions 112 protruding from the side walls of housing 10 and secure the assembly in the housing 10.

In use, contact pins 32 and 34 will be connected to the "tip" conductor and contact pins 52 and 54 will be connected to the "ring" conductor of the telephone line. The protruding arched limbs 90 and 92 of spring contact plate 62 will make contact with a ground plane 114 (see FIG. 4) in the equipment cabinet. When an overvoltage occurs on the "tip" conductor, solid state overvoltage protection device 42 will operate to short-circuit the "tip" conductor, by way of interconnecting strip 26, to ground plane 114. If the overvoltage condition is sustained, the heat generated in the solid state overvoltage protection device 42 will be transmitted via tab 38 to tab 40 and to contact plate 62, eventually causing the plastics film 60 to melt. In view of the pressure applied by screw 84, the plastics material between the tab 40 and the spring contact plate 62 will be exuded, allowing electrical connection between the tab 40 and the spring contact plate 62 to ground the "tip", effecting mechanical short-circuiting of the overvoltage protection device 42. FIG. 2 shows the directions in which current flows in the spring contact member 62 following a fault affecting the "tip" conductor.

If the overvoltage occurs on the "ring" conductor, overvoltage protection device 58 will operate, sustained fault conditions leading to melting of the plastics film 60 trapped between tab 46 and contact plate 62 to effect the short-circuit.

The way in which the spring contact plate 62 is formed is particularly advantageous. The T-shaped ends 82 of limbs 78 can slide along the surface of outer limbs 76 and 80 as the curved portions 90/92 are flexed. This helps to ensure even distribution of the spring pressure and consistent contact with the ground plane. Moreover, this bifurencompasscate contact between limbs 78 and limbs 76 and 80, shares current flow, increasing current carrying capacity as compared with a single contact.

Likewise, the marginal portions 72 and 74 of the spring contact plate 62 can slide relative to the underlying edge portions 72' and 74' of the limbs 80 upon which they bear. This ensures that, as screw 84 is tightened, the force is applied evenly and directly above the corresponding tabs 40 and 46 so that there is little risk of an edge penetrating the plastics film 60 as a result of uneven force distribution.

Two protrusions may be provided on the underside of the spring contact plate 62, each positioned to bear against one of the overvoltage protection devices 42 and 58. The protrusions will improve contact and provide a slight clearance, typically about 0.020 inches, between the top of the overvoltage protection device and the spring contact plate 62.

Figure 5:
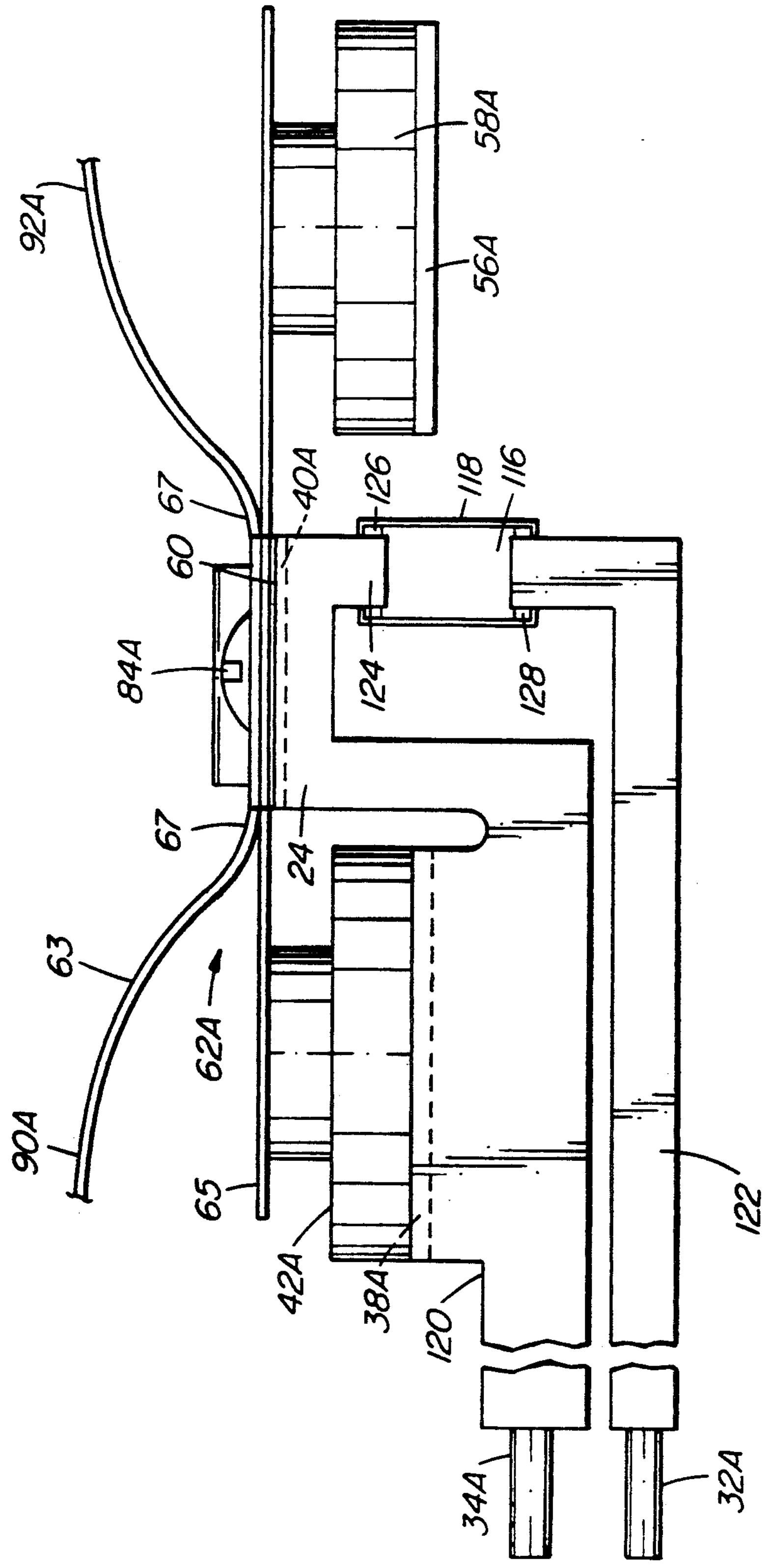
FIG. 5 is a detail view illustrating an embodiment of a second aspect of the invention.

Referring now to FIG. 5, which shows an overvoltage protector with an alternative form of contact member and means for protecting against excessive or "sneak" current, the overvoltage protector is generally similar in construction to that described with reference to FIGS. 1 to 4, but with "sneak" current protection means for protecting against excessive currents. Components corresponding to those shown in earlier Figures are identified by the same reference numerals but with the suffix "A".

One significant difference comprises the spring contact member 62A, which is formed by two strips of spring contact material 63 and 65, the medial portions of which are riveted or welded together as at 67 and extend the full width of the support member 18. Spring contact strip 65 thus extends between spring contact strip 63 and the plastics material 60 on shoulder 24 of the support member 18. Spring contact strip 65 projects both sides of the shoulder 24 to overlie and make electrical contact with the solid state overvoltage protection devices 42A and 58A, respectively. Spring contact strip 63 arches away from spring contact strip 65 to form two arched contact portions 90A and 92A to contact the ground plane 114 (FIG. 4).

Another significant difference is that a pair of planar resistance elements in the form of ceramic chip resistors 116 (only one is shown) are positioned adjacent the medial shoulder or land 24 of support member 18, one such resistor each side of the central fastening screw 84. Each ceramic chip resistor 116 is housed in a recess 118 in the side of the support member 18. Instead of a single connector strip 26, the interconnection for the "tip" conductor is made by conductors 120 and 122, respectively. Conductor 120 is connected at one end to an electrode in the form of contact pin 34A and conductor 122 is connected to an electrode in the form of contact pin 32A. The contact pins 34A and 32A are separate and replace the single U-shaped electrode 28 shown in FIG. 1.

Conductor 120 has a first tab 38A extending beneath solid state overvoltage protector 42A and a second tab 40A, serving as a contact, extending across shoulder or land 24 beneath the thermoplastics film 60. An extension 124 extends from contact portion or tab 40A to overlie and contact one terminal 126 of the ceramic chip resistor 116. The other conductor 122 extends longitudinally of the support member 18 to connect to the other terminal 128 of chip resistor 116. Both conductors 120 and 122 may be soldered to the respective underlying terminals 126 and 128 of the chip resistor 116.

The chip resistor 116 is thus connected between the contact pins 34A and 32A and hence in series with the "tip" conductor of the telephone line. Should a fault occur which is characterized by a sustained abnormally high current in the line, a so-called "sneak current", but not necessarily accompanied by a voltage high enough to operate the overvoltage protectors 42 and 58, the heat generated in the chip resistor 116 will be conducted via extension 124 at the conductor 120, to tab contact 40A, to melt the plastics film 60, and connect the contact tab 40A to the spring contact plate 62, short-circuiting the protector.

It should be appreciated that the connections at the opposite, "ring", side of the support member 18 will be bifurcated in a similar manner and the second chip resistor inserted in series with the "ring" conductor. An overcurrent or "sneak current" in the "ring" line will result in overheating of the second chip resistor to melt the plastics film and short-circuit the "ring" conductor to ground in a similar manner to that described for the "tip" conductor.

A potential limitation of protectors in which a thin plastics film is interposed directly between the contacts which are to short circuit, is that the thermal impedance of the film is relatively low, and becomes even less as the film begins to melt and the contacts begin to close. Hence the ground contact can act as a heat sink and inhibit the heating of the film to its melting point. This could be a problem when the source of the heat is a sneak current. The embodiment disclosed in FIGS. 6 to 12 addresses this issue.

Figure 6:
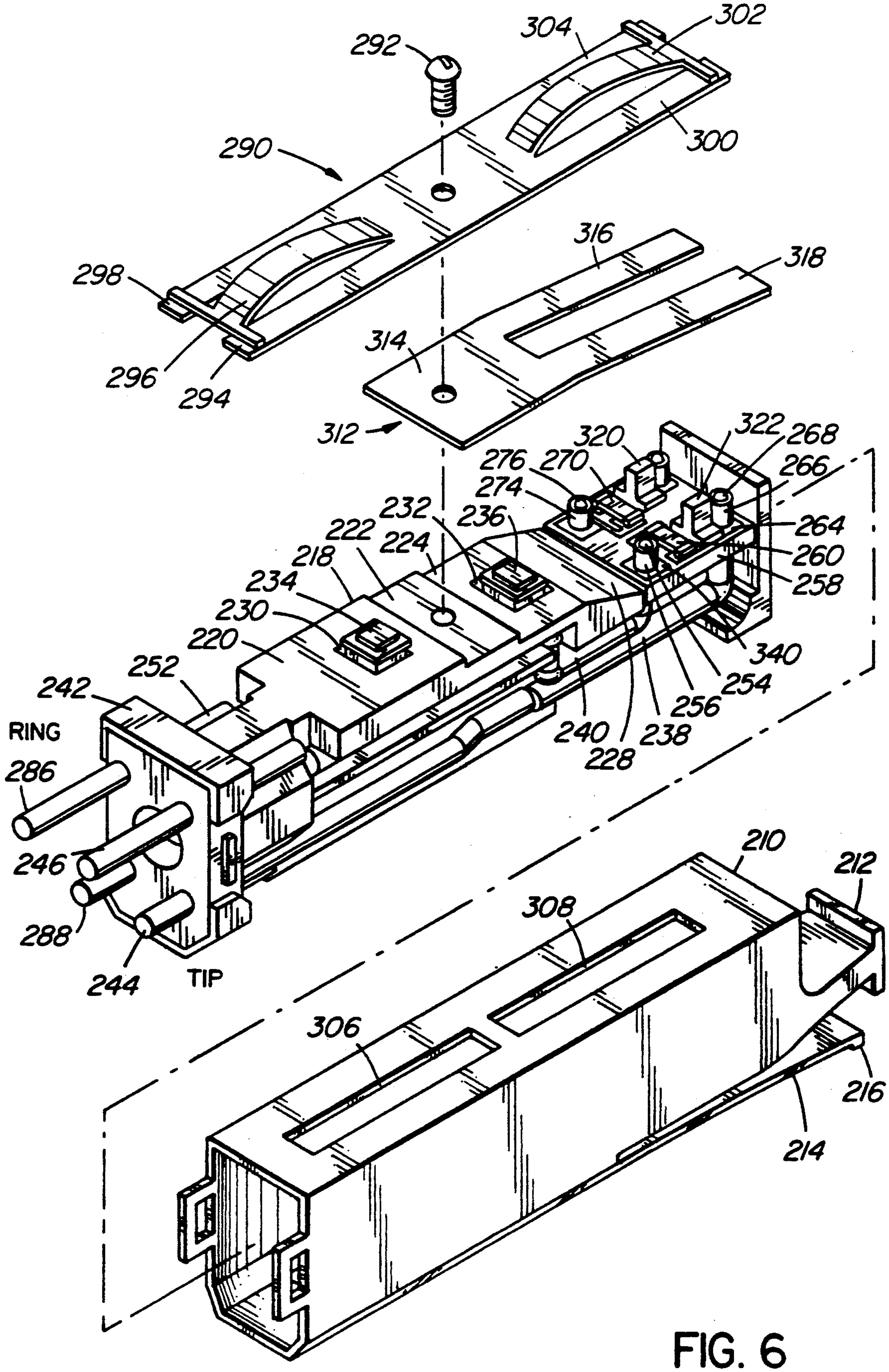
FIG. 6 is a view of a protector according to a third aspect of the invention.
Figure 7:
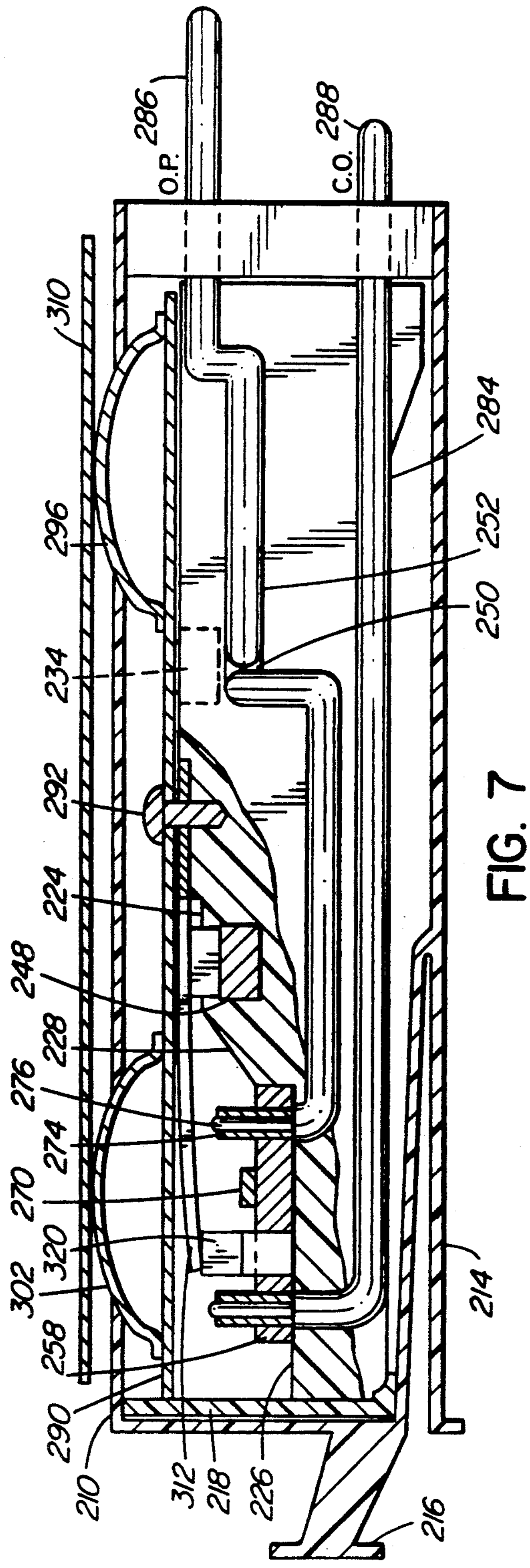
FIG. 7 is a plan view of the protector of FIG. 6.
Figure 8:
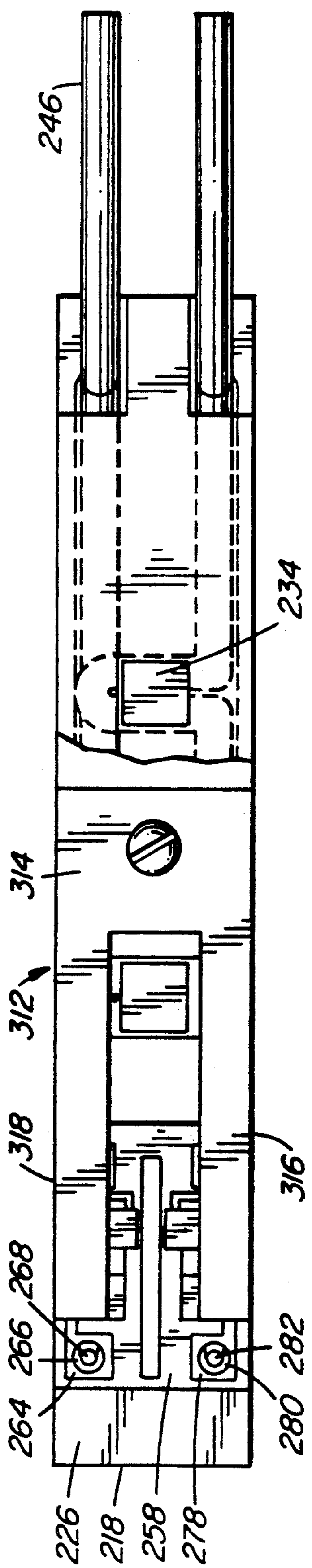
FIG. 8 is a view corresponding to FIG. 6 after the protector has operated.

Referring now to FIG. 6, a combination overvoltage and overcurrent protector is shown with a housing 210 which is similar to the housing 10 shown in FIG. 1. The housing 210 takes the form of an elongate box of square cross-section, closed at one end and open at the other. A handle 212 projects from the closed end. Adjacent the same end, a lever 214 extends generally parallel to the housing 210 and terminates in a lip 216. The lever 214 has a depending detent (not shown) which serves to limit withdrawal of the protector from the equipment at a predetermined position until the lever 214 is flexed to disengage the detent. The protector comprises a generally parallelepiped support block 218 which has one surface (that shown uppermost in FIG. 6) stepped to provide in descending order, four steps 220, 222, 224 and 226 (see also FIG. 7), respectively, with an inclined face 228 between step 224 and step 226. Two recesses 230 and 232 are provided in steps 220 and 224, respectively. The recesses 230 and 232 house overvoltage protectors 234 and 236, respectively.

Interconnecting members 238 and 240, respectively, extend along the side of the support block 218 which is recessed to accommodate them. The interconnecting members 238 and 240 comprise wire rod. At one end, the interconnecting members 238 and 240 extend beyond the end face of the support block 218 and protrude through an end cap 242 as contact pins 224 and 246, respectively. When the protector is installed in the equipment cabinet, contact pin 244 will connect to outside plant and contact pin 246 will connect to a line to the central office.

Interconnecting member 240 has a tab 248 (see FIG. 7) which projects into recess 232, beneath overvoltage protector 236, and makes contact with one terminal of the over-voltage protector 236. A corresponding tab 250 (see FIG. 7) of a corresponding interconnecting member 252 on the RING side of the support block 218 extends into recess 230 to make contact with overvoltage connector 234 in like manner. Adjacent its end remote from the contact pin 246, interconnecting member 240 has a section which extends perpendicularly and terminates in a connector pin 254 which has a reduced diameter. The connector pin 254 extends into a terminal post 256 soldered into a printed circuit board 258 which is mounted upon the lowermost step 226 adjacent the end of support block 218. A ceramic chip resistor 260 is surface-mounted upon the printed circuit board 258 and has one terminal connected by printed circuit conductor 262 to terminal post 256. The other terminal of chip resistor 260 is connected by printed circuit conductor pad 264 to a second terminal post 266 which is mounted upon the printed circuit board 258. A connector pin 268, formed as a reduced-diameter section of interconnecting member 238, protrudes into terminal post 266. Hence, the chip resistor 260 is connected in series between the contact pins 244 and 246, respectively, and hence in series with the line between the central office and the outside plant once the protector is installed.

A second chip resistor 270 is mounted upon printed circuit board 258 and is connected in series with the other wire of the line. Thus one terminal of chip resistor 270 is connected by printed circuit conductor 272 to a terminal post 274 which receives a connecting pin 276 of interconnecting member 252. The other terminal of chip resistor 270 is connected by printed circuit conductor pad 278 to a terminal post 280 which receives a connecting pin 282 formed at one end of an interconnecting member 284. The ends of interconnecting members 252 and 284 remote from the printed circuit board 258 protrude through end plate 242 as contact pins 286 and 288, respectively. Hence, chip resistor 270 is connected in series between contact pins 286 and 288 and hence in series with the line between the central office and the outside plant.

A spring contact member 290 overlies the support block 218 and is fastened to it by a central screw 292. The spring contact plate 290 has three finger portions 294, 296 and 298 at one end and three finger portions 300, 302, 304 at the other end. Middle fingers 296 and 302, respectively, curve away from the support block 218 to protrude through respective slots 306 and 308 in the housing 210. In use, the curved fingers 296 and 302 will make contact with a ground plate 310 of the equipment into which the protector is installed.

A bifurcate contact plate 312 has a bight portion 314 at one end which is clamped between spring contact plate 290 and the step surface 222 of support block 218. The limbs 316 and 318 of the bifurcate contact plate 312 extend longitudinally of the protector to a position above the printed circuit board 258. Their distal ends are supported by plastic spacers 320 and 322, respectively, so that limbs 316 and 318 extend adjacent, but not touching, connecting pins 276 and 254, respectively. The contact plate 312 is resilient, for example spring metal, and so shaped that the limbs 312 and 318 are urged towards the adjacent ends of connecting pins 276 and 254 but prevented from contacting them by the plastic spacers 320 and 322, respectively.

Figure 9:
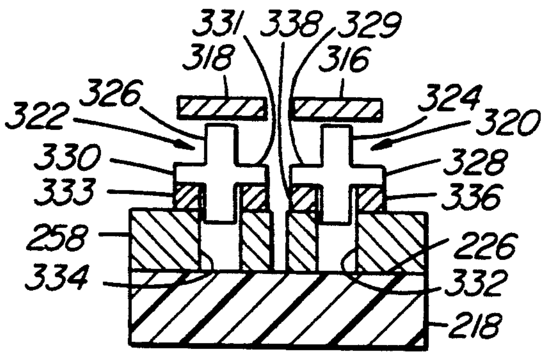
FIG. 9 is an end view of a detail before operation of the protector.

FIG. 9 is a detail diagrammatic end view of the printed circuit board 258 showing the limbs 316 and 318 of contact plate 312 supported by plastic spacers 320 and 322, respectively, in the normal or "open-circuit" position. The plastics spacers 320 and 322 are of cruciform shape, having central limbs or "web" portions 324 and 326, respectively, and lateral arms 328/338 and 330/331, respectively. The web portions 324 and 326 support, at one end, the contact plate limbs 316 and 318, respectively. Their opposite ends extend a small distance into corresponding holes 332 and 334, respectively, in the printed circuit board 258. The lateral arms 328 and 329 of spacer 320 rest upon the subjacent printed circuit conductor sections 336 and 338, respectively, and support the spacer 320 against the spring force exerted by the contact plate limb 316. In like manner, lateral arms 330 and 331 of spacer 322 rest upon subjacent printed circuit conductor sections 333 and 335, respectively.

Figure 12:
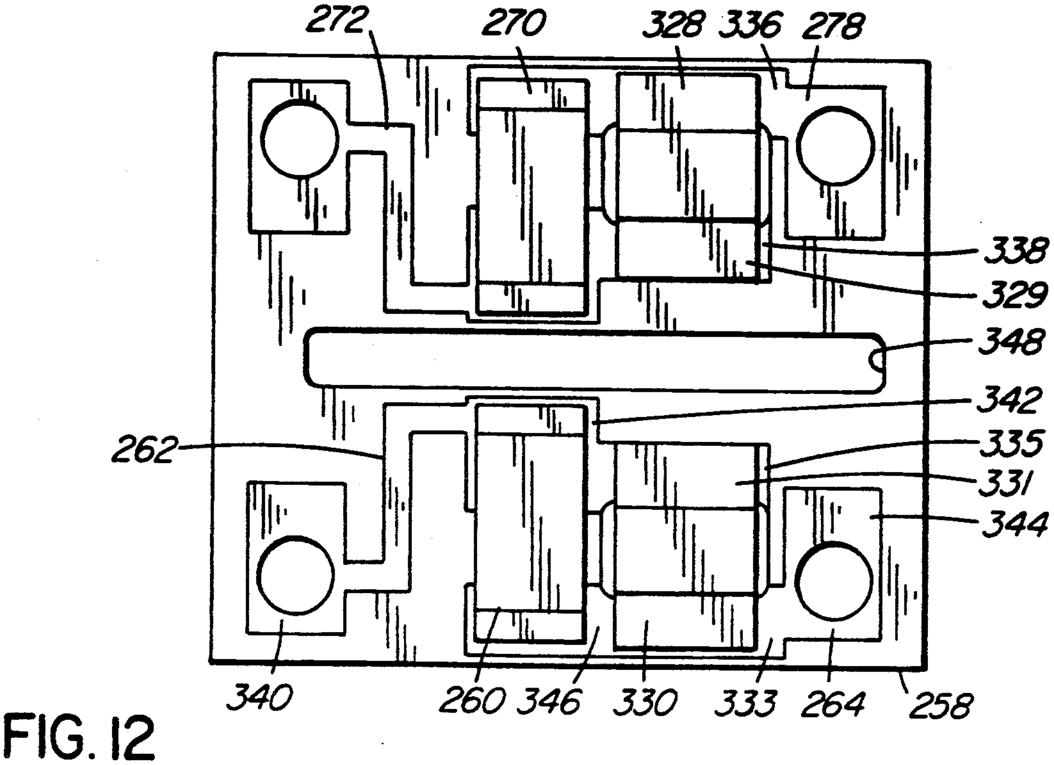
FIG. 12 is a plan view of a printed circuit board assembly of the protector of FIG. 6.

FIG. 12 shows the conductor pattern of the printed circuit board 258 in more detail. Conductor 262 has at one end a solder pad area 340, to which the terminal post 274 will be soldered, and at its other end a conductor pad 342 to which one terminal of resistor 260 is soldered and which extends to join pad 335 beneath the lateral arm 331 of spacer 322. Conductor pad 264, the bonding pad for terminal post 266, is connected to a second bonding pad 346 for the other terminal of resistor 260. Portion 333 which extends between the resistor bonding pad 346 and terminal pad area 264 and beneath the arm 330 of spacer 322, is relatively wide as compared with conductor 262. Conductor 262 which interconnects the resistor bonding pad 342 and the terminal bonding pad 340, is relatively long and narrow. The width of the conductor strip 262 and its length, are selected so that the thermal resistance between the terminal pad 340 and the resistor 260 is much greater than that between the spacer 322 and the resistor 260. This determines the sensitivity of the sneak current protection by controlling heat sink effects due to the thermal mass of ground electrode 114 (FIG. 4) (318 in FIG. 7). The interconnecting member 240, connects pad 340 to SSOVP 236 which in turn is connected by contact member 290 to ground electrode 310, which is, in effect, a virtually infinite heat sink. On the other hand, interconnecting member 238 connects pad 344 to electrode 244 which, in use, is connected to wiring having a relatively low heat sink effect.

Conductors 272 and 278 associated with resistor 270 and spacer 320 are formed in a similar way to conductors 262 and 264 and so will not be described in detail.

A through slot 348 extends down the middle of the printed circuit board 258 to provide thermal isolation between the resistors 260 and 270.

When an overvoltage condition operates SSOVP device 234 heat is conducted via printed circuit conductor 272 to conductor section 338 to heat arm 329 of spacer 320. Heat is also transmitted by way of resistor 270 to conductor section 336 to heat the other arm 328 of the spacer 320. When SSOVP device 236 operates, heat is transmitted in like manner via printed circuit conductor 262 to heat the lateral 330 and 331 of spacer 332.

Figure 10:
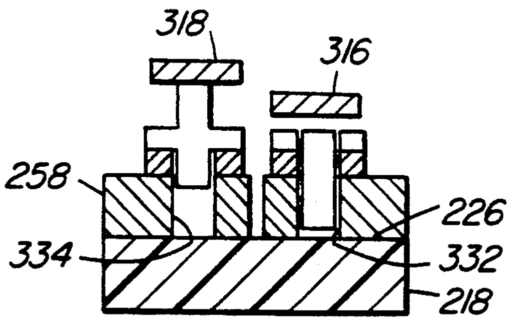
FIG. 10 is a view corresponding to FIG. 9 but after operation of the protector.
Figure 11:
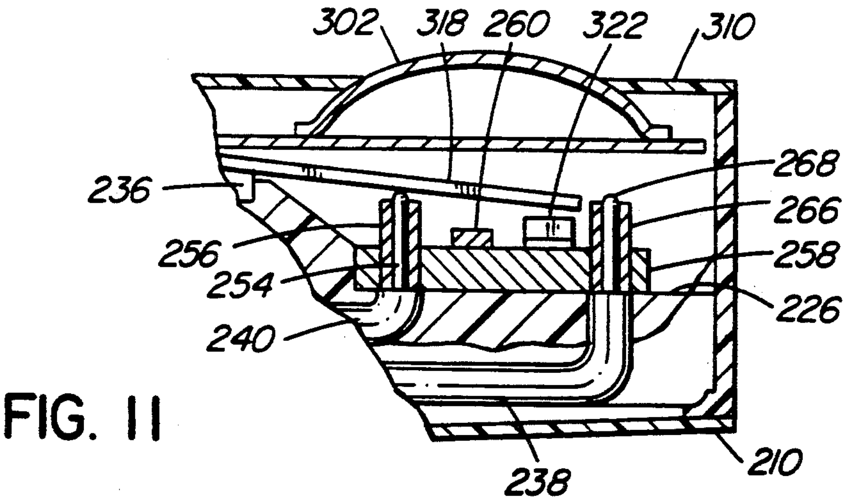
FIG. 11 is a sectional partial view of the protector after operation.

When an excessive (sneak) current heats one of the resistors 270 and 260, the heat is conducted by printed circuit conductors 333 and 335, or 336 and 338, directly to the lateral arms 328 and 329, or 330 and 331 of the associated spacer 320 or 322. When sufficient heating has occurred, the lateral arms 328 or 330 melt or shear with a snap action from the associated web portion 324 or 326. The associated limb 316 or 318 of the spring contact plate 312 displaces the web portion 324 or 326 into the corresponding hole 332 or 334 until the limb 316 or 318 makes contact with the corresponding connector pin 254 or 276 to short circuit the associated RING or TIP to ground. FIGS. 10 and 11 illustrate such displacement of spacer 320 permitting contact between limb 318 and connecting pin 254.

As mentioned previously, the ground electrode 114/318 in the equipment is, in effect, a virtually infinite heat sink and the contact plate 312 is connected to it. The height of the central limb of the spacer provides thermal insulation between the contact plate 312 and the resistance element. This ensures that the heat generated by the resistance element is available to melt the lateral projections.

It should be appreciated that an overvoltage protector will usually produce more heat, when conducting, than a resistance element conducting a sneak current.

In the specific embodiment of FIG. 6–12, the spacers 322 and 320 straddle conductor sections 333/335 and 336/338, respectively, and hence are in parallel with the corresponding resistance element 268 or 270. Consequently, heat from the protector is transmitted to one of the lateral arms via the associated resistance element and directly to the other lateral arm. A modification is envisaged in which both arms of each spacer rest on the same conductor section and hence are both heated to the same extent. This entails enlarging conductor sections 338 and 335 to encompass the holes 332 and 334, respectively, and provide an area of conductor around the hole to contact both arms of the spacer. A separate conductor would connect the resistance element to its associated terminal pad.

The chip resistor could be stocked in various values and readily substituted during manufacture to allow economical manufacturing of protection devices with different current ratings. These advantages are not realised by existing protectors which employ heat coils in the form of wire-wound resistors around plunger pins of gas tube protection devices. Of course, being planar itself, the ceramic chip resistor is particularly advantageously employed in a protector which employs generally "planar" or "epitaxial" components as disclosed hereinbefore.

In the afore-mentioned U.S. Pat. No. 4,056,840, the plastics film is required to protect the gas tube against failing open circuit. Embodiments of the present invention protect the plastics support member 18 and plastics housing 10 against overheating.

The characteristics of the plastics material used for the spacer (film 60, cruciform spacers 320, 322) are determined according to the operating requirements of the device. Thus, since Valox 420SEO, the material of the support member (18, 218), has a heat deflection temperature of about 200° C., and the typical maximum environmental temperature is about 70° C., the plastics spacer must melt at a temperature in the range 70°–200° C. A melting temperature closer to the upper end of the range is preferred since the device would then be less susceptible to early demise due to AC faults. Especially where a thin film, preferably about 0.002 inches, is employed so as to minimize travel of the thermal spring shunt, good dielectric strength, greater than 500 V/mil, is required as also is good creep resistance since the usual design life of such a device is about 40 years. Similar considerations apply to the lateral arms 328, 329, 330, 331 since they also are relatively thin as compared to the length of the central limb 324, 326 which is intended to provide good thermal insulation between the conductors 333, 335, 336 and 338 and the contact limbs 316 and 318. The preferred material, high molecular weight, high density polyethylene, meets these requirements. The specific material described herein (SCLAIR WCI 46C) has a melting point of about 125° C., dielectric strength of about 5000 V/mil, low creep rate, is available in thin films, and the products of its combustion are not corrosive or particularly toxic.

SCLAIR WCI 46C is a polyolefinic polymer of the polyethylene class. It has a clearly defined melting point at the required temperature. It also keeps its conformation requirements up to the melting temperatures. Other polyethelynes, indeed other polyolefines such as polypropylene or polybuteric, can be used providing that the degree of crystallinity, stereospecificity and molecular weight combine to give the required thermal and mechanical properties.

Other polyolefins might also be suitable. A high density, of at least about 0.941, has been found to give a suitably clear and quick transition between the solid and liquid states. For those embodiments of the invention in which the plastics spacer is in the form of a film, manufacturing limitations may limit the specific gravity to about 0.965. A high molecular weight, at least 250,000, has been found to provide the necessary strength to meet the long term creepage requirements and a weight less than 500,000 is preferred.

It is envisaged that other crystalline polymers, such as nylon, could be used since they exhibit a clearly defined melting point. However, because they melt at a higher temperature than SCLAIR WCI 46C, the other components used in the protector, particularly the synthetic plastics support member 18, 218, would need to tolerate the higher temperature. It will be appreciated that, where a synthetic plastics support member is used, its heat deflection temperature should be greater than the melting point of the thermoplastic spacer or film.

Further simplification and economy might be achieved by laminating the plastics film to the spring contact plate before assembly. Moreover, the end cap could be an integral part of the support member. In the case of the embodiment of FIG. 5, the two parts of the spring contact member 62A might be clamped together by means of the screw 84A rather than welded or riveted.

It should be appreciated that the spring contact members 62 (FIGS. 1–4) and 62A (FIG. 5) are interchangeable, regardless of whether or not the overcurrent resistors are incorporated.

It should also be appreciated that the sneak current protector could be used alone.

An advantage of spacing the fusible thermoplastics spacer away from the actual overvoltage protection device is that the thermoplastics material may have a lower melting point than, for example, fluoroplastics. Even through the contacts juxtaposed to the spacer or film are connected to the terminal of the protection device, the interconnection will limit heat conduction. This enables materials to be used which have a lower melting point and which do not produce corrosive by-products of combustion. Polyethylene is such a material.

Fluoroplastics, such as are disclosed in the cited patent specifications, have a poorer resistance to creep, a broader range of deflection temperatures, and their combustion can produce hydrofluoric acid (in the presence of water), which is undesirable in a central office where hundreds of protectors might operate simultaneously, and in subscriber's premises.

An advantage of the "planar" or "laminar" form of protector disclosed herein, i.e. wherein the protection devices and contacts are assembled onto top and side faces of the support member, is that it facilitates automatic manufacture. It is anticipated that this will lead to cost savings compared to known protectors which employ coaxial gas tubes, heat coils, solder discs, and so on. Placing the shunt away from the protection devices (SSOVP) enhances the life expectancy of the device since it avoids early tripping of the protector on low level AC faults that normally can be handled by the SSOVP device. This is in contrast to certain gas tube devices which have a solder pellet mounted directly to the gas tube, and the gas tube device disclosed in the afore-mentioned U.S. Pat. No. 4,212,047 which has a fusible plastics sleeve mounted directly upon the gas tube.

The use of a plastics film which ruptures to allow short-circuiting of the protection devices advantageously reduces the size of the protector and permits an epitaxial form of construction with a generally planar contact plate assembly on one face of a support member.

A disadvantage of protectors employing gas tubes is that the gas tubes are relatively bulky and assembly of the various components is relatively complicated and hence relatively costly. The size of the protector may be reduced by using solid-state devices instead of gas tubes. Such a solid state protector is disclosed in U.S. Pat. No. 4,796,150 by Dickey et al, issued Jan. 3, 1989, to which the reader is directed for reference. Dickey et al disclose a protector having a plurality of disc-shaped solid state protection devices located in recesses in opposite sides of a support member and contacting a central ground plane. These devices are secured to the support member by means of U-shaped spring clips which also provide a path to ground for the surges. Although the individual surge-protection devices are relatively small, the arrangement is still relatively bulky and complicated to assemble.

In preferred embodiments of each aspect of the invention the overvoltage protection device is a solid-state device. It will be appreciated, however, that an alternative protection device, such as a gas tube, could be used.

Mounting the resistance element and circuit elements on a substrate provides a more robust, thermally efficient and reliable protector since it avoids having to solder the resistance element directly to the interconnection means.

Since the "sneak" currents are relatively small, it is preferable to maintain a relatively large separation of the first and second contacts so as to reduce heat absorption. At the same time, however, it is desirable to melt only a relatively small amount of material to cause the contacts to close. The cruciform spacer effects a satisfactory solution to this paradox.

We claim:

1. A protector for protecting telephone equipment against excessive voltages, comprising:

a support member (18)

a protection device (42) supported by said support member (18);

electrode means (32, 34) for coupling said protection device (42) to the equipment to be protected;

mutually proximal first and second contacts (40, 74') spaced from said protection device (42), said first and second contacts being biased one toward the other;

interconnecting means (26) connecting one terminal (42B) of said protection device (42) to said electrode means (32, 34) and to said first contact (40);

a contact member (62) connecting said second contact to a second terminal (42A) of said protection device (42) and comprising a ground contact (90) for connecting to a ground electrode (114) extending adjacent said protector when the protector is installed in said equipment;

spacer means (60) of thermoplastics material preventing electrical connection between said first contact and said second contact, there being a heat transfer path between said spacer and said protection device;

the arrangement being such that excessive heating of the protection device causes the spacer to melt and permit electrical connection between said first and second contacts.

2. A protector as claimed in claim 1, wherein the support member (18) supports a second protection device (58), said protector further comprising second electrode means (52, 54) for coupling said protection device (58) to the equipment to be protected, mutually proximal third and fourth contacts (42, 72'), the four contacts being spaced from both protection devices (42, 58), said third and fourth contacts being biased one toward the other, second interconnecting means (44) connecting one terminal of said second protection device (58) to said second electrode means (52, 54) and to said third contact (46), said contact member (62) connecting said fourth contact to a second terminal of said second protection device (58), said spacer means (60) preventing electrical connection between said third contact and said fourth contact, there being a heat transfer path between said spacer means and said second protection device;

the arrangement being such that excessive heating of the second protection device causes the spacer means to melt and permit electrical connection between said third and fourth contacts.

3. A protector as claimed in claim 1, wherein the contact member (62), protection device (42, 58) and interconnecting means (26, 44), are housed in a housing (10) having at least one aperture (94) in a side juxtaposed to said support member (18), said ground contact (90) being resiliently-biased to project through said aperture.

4. A protector as claimed in claim 1, wherein the interconnecting means (26) extends along one side of the support member (18) to connect to said electrode means (30).

5. A protector as claimed in claim 2, wherein the first and second interconnecting means (26) extend along opposite sides of the support member.

6. A protector as claimed in claim 1, wherein said protection device (42) is located in a recess (20) in said support member (18) and said contact member (62) extends across the mouth of said recess to contact said protection device (42).

7. A protector as claimed in claim 2, wherein said second overvoltage protector device (58) is located in a second recess (22) in said support member (18) and said contact member (62) extends across the mouth of said second recess to contact said second overvoltage protector.

8. A protector as claimed in claim 1, wherein said contact member (62) has slits deefining a resilient longitudinally extending limb that is biased away from said support member to serve as said ground contact (90).

9. A protector as claimed in claim 1, wherein said contact member (62) has a medial portion (64) formed as a spring (66, 68), the second contact comprising a marginal portion of said contact member urged towards said face by said spring.

10. A protector as claimed in claim 2, wherein said contact member (62) has a medial portion (64) formed as a spring (66, 68), the second contact comprising a marginal portion of said contact member urged towards said face by said spring and said fourth contact comprising an opposite marginal portion of said contact member.

11. A protector as claimed in claim 9, wherein said medial portion (64) is substantially semi-cylindrical with its cylindrical axis extending longitudinally of said contact member (62).

12. A protector as claimed in claim 10, wherein said contact member (62) is made of resilient material, and the protector further comprises fastening means (84) for bearing against said medial portion to urge said marginal portion of said contact member towards said support member.

13. A protector as claimed in claim 1, wherein said spacer means (60) comprises high density, high molecular weight polyolefin.

14. A protector as claimed in claim 1, wherein said spacer comprises polyethylene having a molecular weight of at least 250,000.

15. A protector as claimed in claim 1, wherein said spacer comprises polyethylene having a molecular weight in the range 250,000 to 500,000.

16. A protector as claimed in claim 1, wherein said spacer comprises polyethylene having a specific gravity of at least 0.941.

17. A protector as claimed in claim 1, wherein said spacer comprises polyethylene having a specific gravity in the range 0.941 to 0.965.

18. A protector as claimed in claim 13, wherein said spacer comprises polyethylene.

19. A protector as claimed in claim 1, wherein said spacer comprises a film.

20. A protector as claimed in claim 1, wherein said spacer comprises a limb and at least one lateral projection, the projection abutting a heat-conductive element for transmitting heat from the protection device, one of said first and second contacts acting against the limb to urge it towards the heat-conductive element, the arrangement being such that said excessive heating melts the spacer at the junction between the lateral projection and the limb permitting the limb to displace until the first and second contacts make contact.

21. A protector as claimed in claim 1, further comprising overcurrent protection means comprising a resistance element (116) connected to said electrode means (30) so as to be in series with a line to be protected, such that heating of said resistance element by excessive current therethrough will cause said spacer means (60) to melt.

22. A protector as claimed in claim 21, wherein said resistance element (116) is substantially planar and disposed in a recess (118) in said support member (18).

23. A protector as claimed in claim 22, wherein said resistance element (116) is a ceramic chip resistor.

24. A protector, for protecting equipment against excessive voltages and excessive currents, comprising:

at least one overvoltage protection device (42);

a pair of elecctrodes (32A, 34A) for connecting the overvoltage protection device to equipment to be protected;

interconnecting means (120, 122) connecting said pair of electrodes to one terminal of said protection device;

a contact member for connecting a second terminal of said overvoltage protection device (42) to a ground electrode of the equipment;

first and second contacts connected to respective ones of terminals of the protection device;

said first and second contacts being biased one toward the other.

thermoplastics spacer means (60) maintaining separation of said first and second contacts; and a resistance element (116) connected to said interconnecting means and in series between one (32A) of said electrodes and said one terminal (42A) of said overvoltage projection device (42);

means serving to conduct heat from both said resistance element and said overvoltage protection device to said spacer means;

the arrangement being such that melting of said spacer means by heat from either one of said protection device and said resistance element permits electrical connection between said first and second contacts.

25. A protector as claimed in claim 24, wherein said spacer comprises a limb and at least one lateral projection, the projection abuting a heat-conductive element for transmitting heat from the resistance element, one of the pair of contacts acting against the limb to urge it towards the heat-conductive element, the arrangement being such that heat generated by an excessive current melts the spacer at the junction between the lateral projection and the limb and the limb is displaced until the contacts make contact.

26. A protector as claimed in claim 24, wherein said resistance element (116) is substantially planar and disposed in a recess (118) in said support member (18).

27. A protector as claimed in claim 24, wherein said resistance element (116) is ceramic chip resistor.

28. A protector as claimed in claim 2, further comprising overcurrent protection means comprising resistance elements (116) each connected to a respective one of said first and second electrode means so as to be in series with a line to be protected, there being a heat transmissive path between each resistance element and a respective one of the spacer means, such that heating of a said resistance element by excessive current therethrough will cause said melting of said spacer means.

29. A protector as claimed in claim 1, wherein said overvoltage protection device (42) is a solid-state protector.

30. A protector as claimed in claim 28, wherein each said overvoltage protection device (42) is a solid-state protector.

31. A protector for protecting against excessive currents in telecommunications euipment, comprising a resistance element, electrodes for connecting the resistance element in series with a line to the equipment which is to be protected, a contact member for connecting to a ground electrode when the protector is in use, a pair of mutually proximal contacts connected one to the contact member and the other to one of the electrodes, said contacts being biased one towards the other, spacer of insulating material preventing electrical contact between said contacts, said spacer comprising a limb and at least one lateral projection, the projection abuting a heat-conductive element connected to the resistance element, one of the pair of contacts acting against the limb to urge it towards the heat-conductive element, the arrangement being such that heat generated by an excessive current in the resistance element melts the spacer at the junction between the lateral projection and the limb and the limb is displaced until the contacts make contact.

32. A protector as claimed in claimed 31, wherein the resistance element is mounted upon a printed circuit board.

33. A protector as claimed in claim 32, wherein said resistance element is connected to said electrodes by circuit elements printed on said printed circuit board.

34. A protector as claimed in claim 33, wherein at least one of said circuit elements is circuitous and dimensioned to provide a desired thermal impedance between said resistance element and said spacer.

35. A protector as claimed in claim 31, wherein said spacer is mounted upon a support having a hole, said heat-conductive element being disposed adjacent said hole and said limb being aligned with said hole, said projection being supported at the periphery of the hole, wherein melting of at least part of the spacer in the vicinity of the junction between the arms and the limb allows the limb to enter the hole.

36. A protector as claimed in claim 35, wherein the resistance element is mounted upon a printed circuit board.

37. A protector as claimed in claim 36, wherein said interconnecting means comprise circuit elements printed on said printed circuit board.

38. A protector sd claimed in claim 37, wherein said circuit elements are circuitous and dimensioned to provide a predetermined thermal impedance between said resistance element and said interconnecting member.

39. A protector as claimed in claim 31, comprising a second resistance element, connected to electrodes for connection in series with second line to equipment to be protected, and a thermal barrier between the first resistance element and the second resistance element.

40. A protector as claimed in claim 39, wherein said second resistance element is connected to a second pair of contacts, such contacts being maintained apart by a second insulating spacer having a limb and second projection projecting laterally from the limb, said projection being supported by a second heat-conductive element, the second pair of contacts being urged one towards the other by the one of the second pair of contacts, the arrangement being such that excessive current in said second resistance element effects melting of at least part of the second spacer in the vicinity of the junction between the projection and the limb allowing the limb to displace until the contacts meet.

41. A protector as claimed in claim 31, wherein said resistance element (116) is a ceramic chip resistor.

42. A protector for protecting telephone equipment against excessive voltages comprising:

a support member;

an overvoltage protection device supported by said support member;

electrode means for coupling said protection device to the equipment to be protected;

interconnecting means connecting one terminal of said protection device to said electrode means and having a first contact;

a contact member comprising a ground contact for contacting a ground electrode extending adjacent said protector when the protector is installed in said equipment and second contact juxtaposed to said first contact, said first contact and said second being biased one toward the other;

a spacer of thermoplastics material separating said first contact and said second contact, said spacer comrising a limb and at least one lateral projection, the projection abuting a heat-conductive element for transmitted heat from the protection device, one of said first and second contacts acting against the limb to urge it towards the heat-conductive element, the arrangement being such that said excessive heating melts the spacer at the junction between the lateral projection and the limb permitting the limb to displace until the first and second contacts make contact.

43. A protector, for protecting equipment against excessive voltages and excessive currents, comprising:

at least one overvoltage protection device (42);

a pair of electrodes (32A, 34A) for connecting the overvoltage protection device to equipment to be protected;

interconnecting means (120,122) connecting said pair of electrodes to one terminal of said protection device;

a contact member for connecting a second terminel of said overvoltage protection device (42) to a ground electrode of the equipment;

first and second contacts connected to respective ones of terminals of the protection device, said first and second contacts being biased one toward the other;

thermoplastics spacer means (60) maintaining separation of said first and second contacts; and a resistance element (116) connected to said interconnecting means and in series between one (32A) of said electrodes ands said one terminal (42A) of said overvoltage protection device (42);

the interconnecting means serving to conduct heating from said resistance element to said means;

the arrangement being such that melting of said spacer measn permits electrical connection between said first and second contacts, the resistance element and the protector being both coupled thermally to the spacer, the coupling between the protector and the spacer having a greater thermal impedance than the coupling between the resistance element and the spacer.

44. A protector as claimed in claim 43, wherein the interconnecting means between the protector and the spacer is longer than that between the spacer and the resistance element.

45. A protector as claimed in claim 43, wherein the interconnecting means between the protector and the spacer has a lesser cross-section than that between the spacer and the resistance element.

* * * * *